Jan. 10, 1967   J. F. SCHIRTZINGER   3,296,994
STRUCTURE FOR TRANSPORT OF MATERIALS THROUGH WATER
Filed Oct. 26, 1964   2 Sheets-Sheet 1
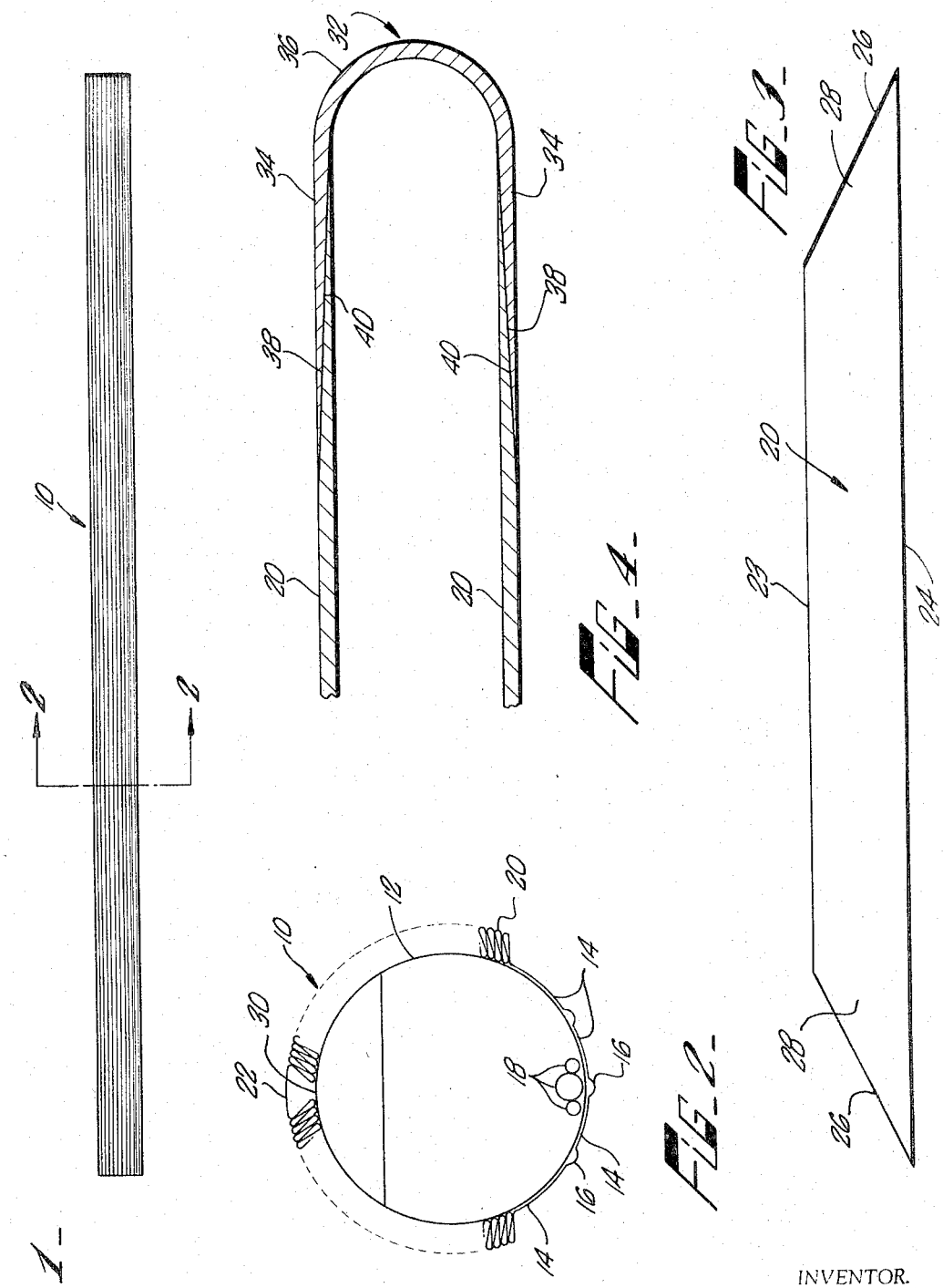
INVENTOR.
JOSEPH F. SCHIRTZINGER
BY
ATTORNEYS

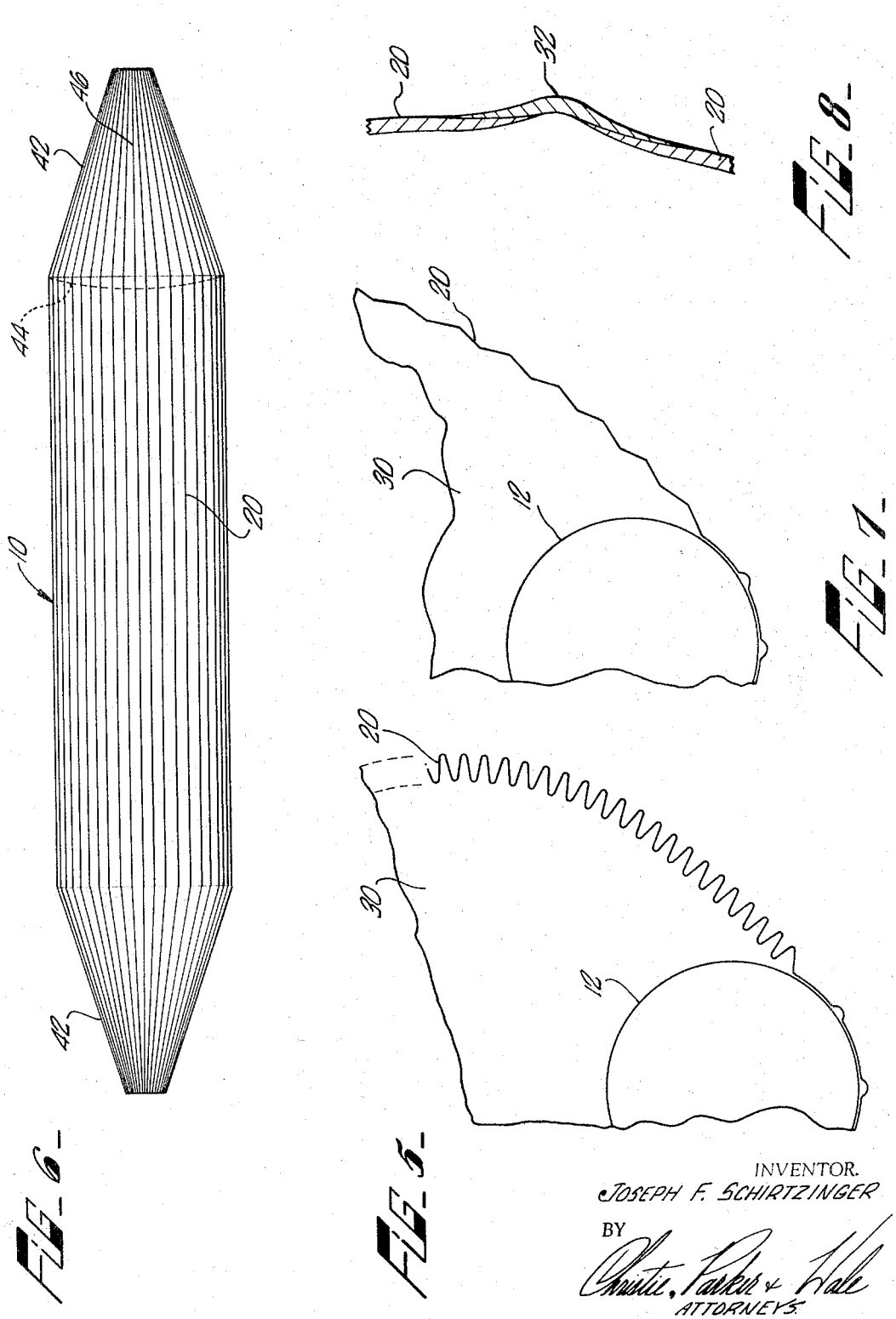

United States Patent Office 3,296,994
Patented Jan. 10, 1967

3,296,994
STRUCTURE FOR TRANSPORT OF MATERIALS
THROUGH WATER
Joseph F. Schirtzinger, Pasadena, Calif., assignor to Air Logistics Corporation, Pasadena, Calif., a corporation of California
Filed Oct. 26, 1964, Ser. No. 406,507
5 Claims. (Cl. 114—74)

This invention relates to water transports and, more particularly, to submersible or semi-submersible transports for shipment of bulk materials through water.

In shipping of bulk materials through water, signficant economic advantages are obtained by use of transports which can be expanded to over-all dimensions sufficient to accommodate the volume of material to be shipped and can then be folded when empty to substantially reduced over-all dimensions. Such a capability can make water movement of materials economically feasible in situations where supply and demand considerations justify only oneway shipment of materials, and return of the transport to the point of origin in its filled dimensions is uneconomical. The latter circumstance arises, for example, where the return trip involves adverse oceanic or river currents.

The present invention provides a structure for transport of materials through water. The structure couples an unusually high cargo capacity in its expanded condition with a self-folding characteristic which enables return of the transport without cargo to its point or origin in dimensions substantially reduced from the filled dimensions. A minimum surface is therefore provided for the return trip so that either a higher return speed or large saving in towing energy is gained. Although the transport of the present invention can be used for movement of various liquids such as petroleum products and chemicals, its capability of moving amounts of liquids in large quantities not previously contemplated causes it to be particularly adapted to large scale shipment of fresh water.

Heretofore, through-water transport of fresh water in towed containers has been on a relatively small scale because of the unavailability of transports capable of moving large quantities of fresh water in an economical manner. As a result, fresh water shipment has been used only as a stop-gap or emergency measure, and not as a means for providing a supply to meet large scale demands on a continuing basis.

As is well known, localized fresh water supplies in various areas are often sufficient to meet needs for other areas if suitable means were available to distribute the water from those areas in which it is abundant to those in which the supply is short. As an example, the northern portion of the Pacific Coast area of the United States has a surplus of fresh water which is generally discharged by rivers into the ocean, whereas the southern portion of this area does not have an adequate local supply. This same area has, in addition, a combination of ocean currents and depths of navigable water which can make possible the supply of fresh water to the southern area by movement in suitable ocean-going transports. Other parts of the world present comparable situations in which water deficient coastal areas are within reach of abundant water supplies through water transport. Examples are Southern Italy, the Eastern Mediterranean area, the Northwestern Coast of the Indian Ocean, and the Western Coast of South Africa. The capabilities of the water transport of the present invention make through-water supply of fresh water to these areas economical on a continuous large scale basis.

In a copending application, Serial No. 406,506 filed October 26, 1964, there is described an expansible and self-folding container having high structural strength. The described container has a structure enabling expansion to large over-all dimensions while being self-folding as emptied so it assumes substantially reduced over-all dimensions. The present invention combines the expansible and self-folding features of this structure with a semi-rigid tubular member so as to provide an expansible and self-folding water transport for bulk shipment of liquids together with liquid or solid ballast materials. The ballast materials themselves can have economic value at the destination.

The present invention is a transport in which a plurality of sheets, each having two longitudinal edges, are joined together along the edges by plastic means to provide a substantially corrugated pattern of sheets in a folded position. Means are provided at the ends of the sheets to define a fluid-tight enclosure together with the sheets and the joining means. At least one longitudinally extending semi-rigid tubular member which acts as a ballast tube is joined to the sheets to be within the enclosure. The plastic joining means has a high ratio of tensile strength to tensile modulus of elasticity.

In a presently preferred embodiment of the present invention, the semi-rigid tubular member is disposed near the bottom of the enclosure defined by the longitudinal sheets. The interior of the tubular member provides a ballast-carrying compartment, and the enclosure defined by the sheets provides a liquid-carrying compartment. The longitudinal sheets include tapered edges at each end. The tapered edges are joined by the joining means so that, in the expanded position, tapered end sections are formed. The tapered end sections provide advantageous hydrodynamic characteristics when the transport is towed or moved through water.

The materials from which the joining means of the transport of the present invention are made are characterized by a capability of storing energy without hysteresis loss. The structural requirement of a high ratio of tensile strength to tensile modulus of elasticity for the joining means is particularly found in filament-reinforced laminated thermosetting plastic materials. Reinforcement of such materials is achieved by a parallel array of natural or synthetic filaments in each of the laminae. In the laminated structure, the filaments of a given lamina are oriented crosswise to the filaments in the overlying and/or underlying lamina. A preferred form of plastic material, sold under the mark "Stratoglas" consists of fiber glass filaments bonded together with an epoxy resin to provide a reinforced laminated plastic. The material possesses an unusual combination of structural strength and impact resistance. Its flexural characteristics and moldability permit forming of joints which produce longitudinal folds in the transport as the contained liquid is withdrawn, and enable the transport to assume an elliptical or circular cross-section as it is filled.

As another embodiment of the invention, diaphragm means are fitted within the enclosure to isolate at least one end of the transport and to form a separate compartment within the enclosure. This compartment is placed under pressure by forcing a liquid into it. The applied pressure is substantially greater than the pressure applied within the remainder of the enclosure. It is accommodated by making the end section from sheets that are structurally stronger than those used to define the remainder of the enclosure, but are otherwise similar in structure. The pressurized end section forms the leading section of the transport as it is towed and prevents deformation of the leading surfaces with resultant flutter during water movement.

The advantages of the transport of the present invention and the manner of its use will be better understood from the following description taken in conjunction with the accompanying drawings in which:

FIG. 1 is a schematic representation of an elevational view of an embodiment of the transport of the present invention in a folded position;

FIG. 2 is a schematic representation of an enlarged sectional view showing the transport as seen along line 2—2 of FIG. 1 in a folded position;

FIG. 3 is a plan view of a plastic sheet removed from the transport of FIG. 1;

FIG. 4 is an enlarged fragmentary view showing an embodiment of a joint used to join the sheets of the transport of FIG. 1;

FIG. 5 is a schematic representation of an enlarged fragmentary sectional view generally taken along line 2—2 of FIG. 1 and showing a portion of the transport in a partially expanded position;

FIG. 6 is an elevational view of the transport after it is fully expanded;

FIG. 7 is a sectional view generally taken along line 7—7 of FIG. 6 and showing a portion of the transport after it is in a fully expanded position; and FIG. 8 is an enlarged fragmentary view showing one of the joints and its associated sheets after the container is in a fully expanded position.

With reference to FIGS. 1 and 2, a transport 10, shown in its folded position, includes an elongate semi-rigid cargo tube 12. Bonded to a peripheral outer portion of the tube are four sheets 14 which are coextensive in length with the cargo tube. Sheets 14 are joined along their longitudinal edges by joints 16 to be described. It will be understood that the number of sheets bonded to the cargo tube may be fewer or greater than four. The sheets act only as a means for attachment of the expansible and self-folding structure to be described.

Although the cargo tube may be formed from various materials, filament-wound fiber glass tubes provide the requisite rigidity and strength. Some degree of flexibility along the longitudinal dimension is required in the case of long cargo tubes. The cargo tube has a diameter sufficient to accommodate the amount of ballast required as commensurate with the amount and specific gravity of the liquid to be carried by the transport.

Auxiliary rigid tubes 18 are fitted within the cargo tube and are coextensive in length. The auxiliary tubes are used for air storage and for flotation control where the transport is operated fully submerged. Because of the length of the transport, suitable depth control equipment (not shown) is positioned at intervals along the length of the auxiliary tubes which are compartmented to provide localized control. The depth control equipment operates in conjunction with associated auxiliary tanks according to well known principles governing operation of submerged craft.

The outermost edge of the outermost sheet of sheets 14 is joined along its longitudinal edge to a flat sheet 20. Each flat sheet 20 is in turn joined along its longitudinal edge to the longitudinal edge of an adjacent identical flat sheet. Successive corresponding joining of additional sheets encompasses the cargo tube with a plurality of sheets in a corrugated pattern in the folded position of the transport. Sheets 20 are not bonded to the cargo tube and are free to expand away from the outer surface of the tube.

Although not essential to provide the encompassing plurality of sheets, a transition sheet 22 of the same material as sheets 20 can be joined by an expanded joint of the type to be described to the sheets 20 adjacent to it on either side. In the folded position, sheet 22 tends to be disposed circumferentially with respect to the cargo tube, whereas sheets 20 tend to be disposed radially with respect to it. As shown in the drawing, sheet 22 enables a smooth transition between the plurality of sheets extending from the outermost edge of one sheet 14 and the plurality of sheets extending from the outermost edge of another sheet 14.

Sheets 20 are preferably formed of the same reinforced plastic material as the joints, which will be described. Since the sheets are not subject to an unusual amount of bending upon expansion, other more rigid materials may be employed for some transports. However, for the large transports within the contemplation of the invention, the inherent structural characteristics of the reinforced plastic materials enable use of a thin wall structure which provides a significant economy in material costs.

As shown in FIG. 3, each sheet 20 includes a longitudinal edge 23 and a longer parallel longitudinal edge 24. The longitudinal edges are joined by angled edges 26 to provide a tapered end portion 28 at opposite ends of sheet 20. It will be understood that edges 26 may also be curved to provide tapered end portions.

In the transport, each sheet 20 is joined along longitudinal edge 23 and angled edges 26 to the corresponding longitudinal edge and angled edges of an adjacent sheet by a joint to be described. Similarly, longitudinal edge 24 is joined to the corresponding longitudinal edge of another adjacent sheet. The sheets are joined to provide a series of longitudinal folds.

Joining of angles edges 26 of adjacent sheets at opposite ends of the sheets produces an envelope which defines an enclosure 30 between the interior surfaces of sheets 20 and the exterior surface of cargo tube 12. The described structure can be made in a variety of sizes and may be utilized to provide transports of unusually large capacity. The transport may be formed from reinforced plastic sheets, four to six feet in width and as long as required to meet the intended utilization.

The sheets are joined at their longitudinal edges by joints 32, of which one embodiment is shown in enlarged detail in FIG. 4. This joint is molded from a reinforced laminated plastic material such as the product already described as sold under the trademark "Stratoglas." Sheets having an average thickness of about $\frac{1}{16}''$ (0.060'') can be used, as such sheets, consisting of oriented lamina of parallel glass filaments bonded by an epoxy resin, provide a flexural yield strength as high as 180,000 p.s.i. in the direction of the filaments. The joint is formed by transversely folding a longitudinal strip upon itself to provide in cross-section a pair of parallel legs 34 extending from a curved closure 36. A scarf 38 is formed in the interior surface of each of the legs, and a corresponding scarf 40 is formed in each of the longitudinal edges and angled edges of the plastic sheet. A scarf joint is produced between each leg of joint 32 and the plastic sheet longitudinal edges and angled edges by bonding the corresponding scarfs together with a suitable resin or the like.

It will be understood that joints corresponding in shape to joint 32, as shown in FIG. 4, can be integrally formed with plastic sheets having the characteristics requisite for the joint material. With larger transports, however, it is more convenient to form the joints separately and secure them to the plastic sheets, as has been described.

As to the material from which the joints are formed, the ratio ($s_M/E$) of the maximum bending stress ($s_M$) to the modulus of elasticity (E) should be as high as possible. It can be shown that this ratio can be equated to the ratio ($T/R$) of the thickness of the material (T) to the radius of bend (R) of the joint. To meet the requirements for the transport of the present invention, the thickness must be great enough to provide the requisite strength while the radius of bend must be small enough to provide minimum over-all dimensions in the folded position of the container. Filament-reinforced laminated plastic materials of the type described meet these requirements. Their $s_M/E$ ratio is between 0.03 and 0.04. With a material thickness of 0.1", a radius of bend between 2.5" to 3.3" can be obtained with retention of the self-folding characteristic.

In operation, the cargo tube of the transport is loaded at the point of origin with ballast preferably a material having utility and economic value at the destination. Examples of solid ballast materials that could be utilized in large amounts are coal, phosphate rock, construction sand, crushed rock, solid rock, or beach replacement sand. By closing the ends of the cargo tube, slurries of some of the above-enumerated materials may be utilized as well as liquids having densities greater than salt water.

After loading of ballast, enclosure 30 between the cargo tube and the interior of sheets 20 is filled with liquid. As additional liquid is pumped into the enclosure, the force exerted on the interior surfaces of plastic sheets 20 begins to expand the envelope of the transport. The sheets are moved outwardly between their longitudinal edges as the joints are opened. FIG. 5 is a fragmentary view showing a portion of the envelope in a partially expanded position. Continued addition of liquid expands the envelope to the fully expanded position in which, as indicated by the fragmentary view in FIG. 7, the envelope has a substantially circular cross-section. As particularly shown in FIG. 8, the flexural modulus of the joint material enables the joints to be opened so that each leg of the joint is displaced from each other almost 90° from its position when the container is in a folded position. However, even with this degree of bending, the yield point of the material is not exceeded so that no permanent deformation of the joints and sheets defining the enclosure takes place.

In its fully expanded position, the angled edges of the adjacent sheets form tapered and substantially conical sections 42 at opposite ends of the transport, as particularly shown in FIG. 6.

The transport is then moved either by towing or its own propulsion means to the destination. During transit, the tapered leading end of the transport reduces hydrodynamic resistance. As the liquid is removed from the enclosure at the destination, the self-folding characteristic of the structure causes the envelope to return to a folded position, as shown in FIGS. 1 and 2. The ballast material can be removed by conventional unloading means. Once emptied, the transport can be returned without cargo to the point of origin in its reduced dimensions.

As another embodiment of the present invention, a diaphragm 44 (shown by a hidden line in FIG. 6) may be inserted within the enclosure to form a separate compartment in the region indicated by reference character 46. This compartment may be pressurized to a higher pressure than that within the remander of the enclosure. The end section containing the pressurized compartment forms the leading portion of the transport during transit through water. The pressurized compartment acts to prevent deformation of the end section.

The structural characteristics of the transport of the present invention enable construction of transports having the dimensional capability for moving large quantities of liquids. For example, a transport 6000 feet long with a 200-foot diameter in its expanded position is capable of carrying 4300 acre feet of liquid. This size transport requires 18,000 H.P. to produce a five-knot cruising speed. Where the liquid to be transported is fresh water, and shipment is through salt water, the buoyancy provided by the fresh water cargo determines the submerged weight of cargo that is to be carried in the cargo tube or tubes. For the dimensions given above, where the liquid carried is fresh water, 104,000 long tons of submerged weight could be carried.

With the transport of the present invention, a number of different envelope configurations, size, cargo combinations, and loading methods may be used. The transports may be large fully-submersible or semi-submersible types capable of carrying single or multiple liquid cargoes. Smaller units may be adapted to be beachable so that the transport may be drawn up to land at the point of destination and serve as a storage container until its liquid cargo is removed. Further, flexible partitions may be provided within the enclosure so that, if desired, incompatible liquids can be carried in separated enclosures. Such variations and modifications are within the scope of the present invention as has been described.

What is claimed is:

1. A structure for transport of materials through the water comprising:
   (a) an elongate semi-rigid tubular member;
   (b) a plurality of sheets, each having two longitudinal edges;
   (c) plastic means joining each edge of each sheet in the plurality to an edge of different adjacent sheets to provide a substantially corrugated pattern of sheets in a folded position;
   (d) means joining a longitudinal edge of two different sheets of the plurality of sheets to a portion of the outer surface of the tubular member along its length to form an envelope of sheets encompassing the tubular member; and
   (e) means at the ends of the sheets to define a fluid-tight enclosure together with the sheets and the joining means;
   (f) said plastic having a high ratio of tensile strength to tensile modulus of elasticity enabling the joining means to be opened to expand the sheets to a substantially elliptical cross-section by pressure from within the enclosure and further enabling the joining means to return the sheets to the folded position upon removal of the pressure.

2. A structure for transport of materials through water comprising:
   (a) an elongate semi-rigid tubular member;
   (b) first and second sheets each having two longitudinal edges;
   (c) means joining one longitudinal edge of the first and second sheets respectively to a portion of the outer peripheral surface of the tubular member along its length;
   (d) a plurality of sheets corresponding to the first and second sheets, each having two longitudinal edges;
   (e) plastic means joining the longitudinal edge of one of the plurality of sheets to the other longitudinal edge of the first sheet and joining the longitudinal edge of another of the plurality of sheets to the other longitudinal edge of the second sheet;
   (f) plastic means joining each edge of each additional sheet in the plurality to an edge of different adjacent sheets to provide a substantially corrugated pattern of sheets in a folded position encompassing the tubular member; and
   (g) means at the ends of the first and second sheets and the plurality of sheets to define a fluid-tight enclosure together with the sheets and the joining means;
   (h) said plastic having a high ratio of tensile strength to tensile modulus of elasticity enabling the joining means to be opened to expand the sheets to a substantially elliptical cross-section by pressure from within the enclosure and further enabling the joining means to return the sheets to the folded position upon removal of the pressure.

3. A structure for transport of materials through water comprising:
   (a) an elongate semi-rigid tubular member;
   (b) a plurality of sheets, each including a longitudinal edge, a longer longitudinal edge and an angled edge at each end joining the longitudinal edges;
   (c) plastic means joining the longer longitudinal edges of adjacent sheets to provide an inward longitudinal fold in a substantially corrugated pattern of sheets in a folded position;

(d) plastic means joining the longitudinal edge and the angled edges of adjacent sheets to provide an outward fold in said corrugated pattern;

(e) means joining a longitudinal edge of two different sheets of the plurality of sheets to a portion of the outer peripheral surface of the tubular member along its length;

(f) said joined sheets forming an envelope encompassing the tubular member and having substantially conical closed ends in an expanded position, (i) said envelope defining a fluid-tight enclosure; and (g) said plastic having a high ratio of tensile strength to tensile modulus of elasticity enabling the joining means to be opened to expand the sheets to a substantially elliptical cross-section by pressure from within the enclosure and further enabling the joining means to return the sheets to the folded position upon removal of the pressure.

4. Transport in accordance with claim 3 wherein the plastic material is a reinforced plastic including lamina of parallel fiber glass filaments bonded by a resin.

5. Transport in accordance with claim 3 wherein means are joined to the interior surfaces of the sheets to extend transversely within the enclosure and form a fluid-tight compartment defined by said means and one of the substantially conical closed ends.

References Cited by the Examiner

UNITED STATES PATENTS

| | | | |
|---|---|---|---|
| 2,421,613 | 6/1947 | Gray et al. | 150—5 X |
| 2,551,315 | 5/1951 | Christopher et al. | 128—227 |
| 2,756,777 | 7/1956 | Bourns et al. | 29—454 X |
| 2,797,112 | 6/1957 | Ziebold | 29—454 X |

FRANKLIN T. GARRETT, *Primary Examiner.*